Figure 1:
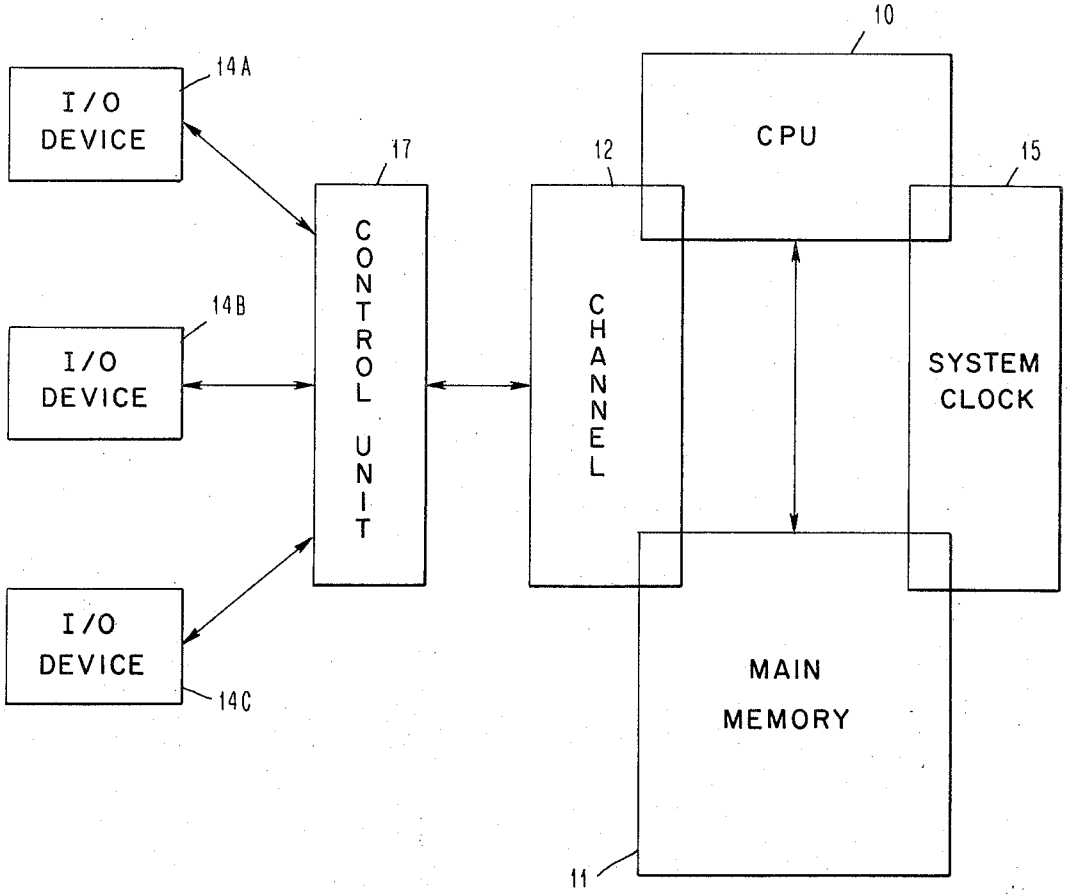
Figure 2A:
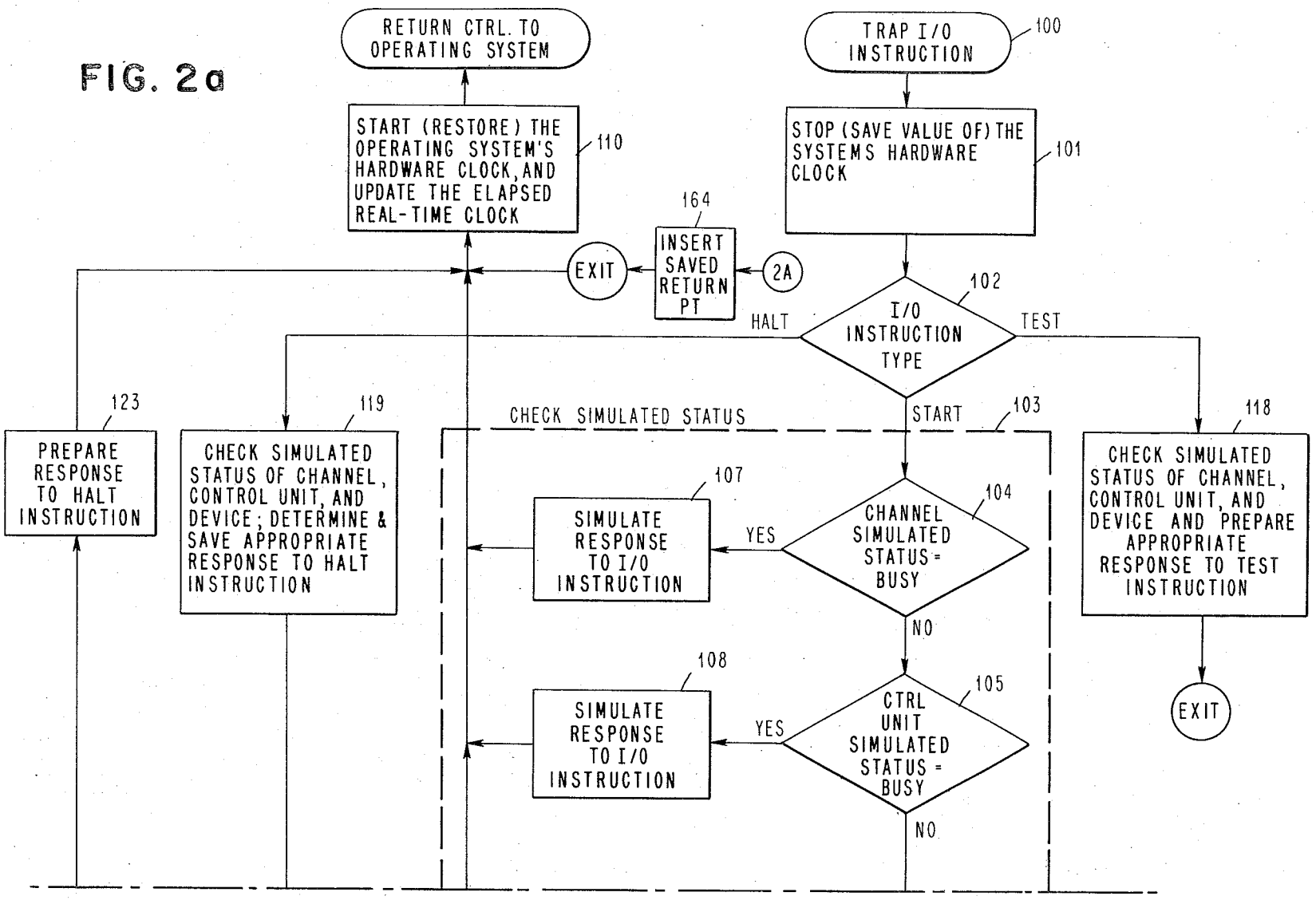
Figure 2B:
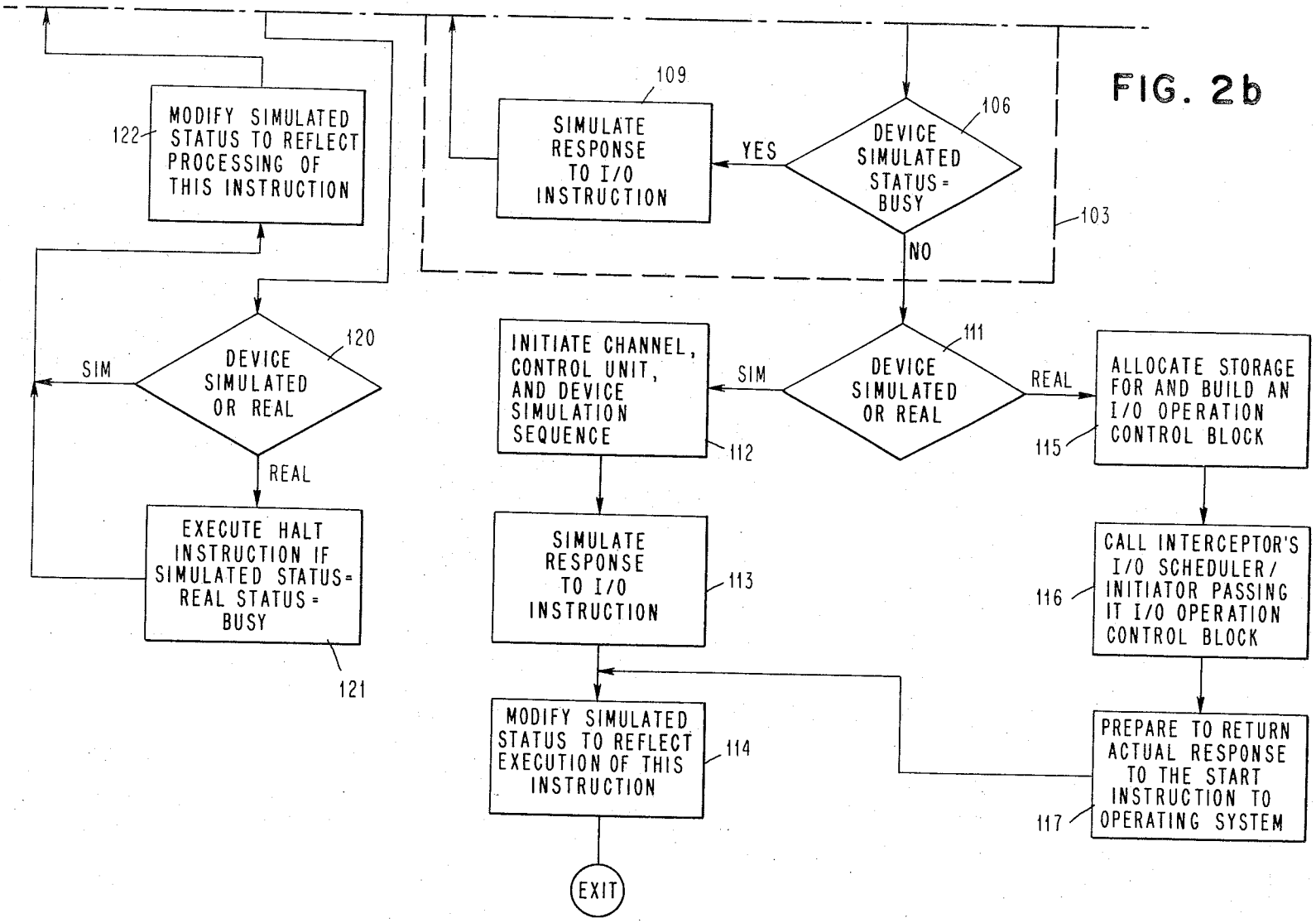
Figure 3A:
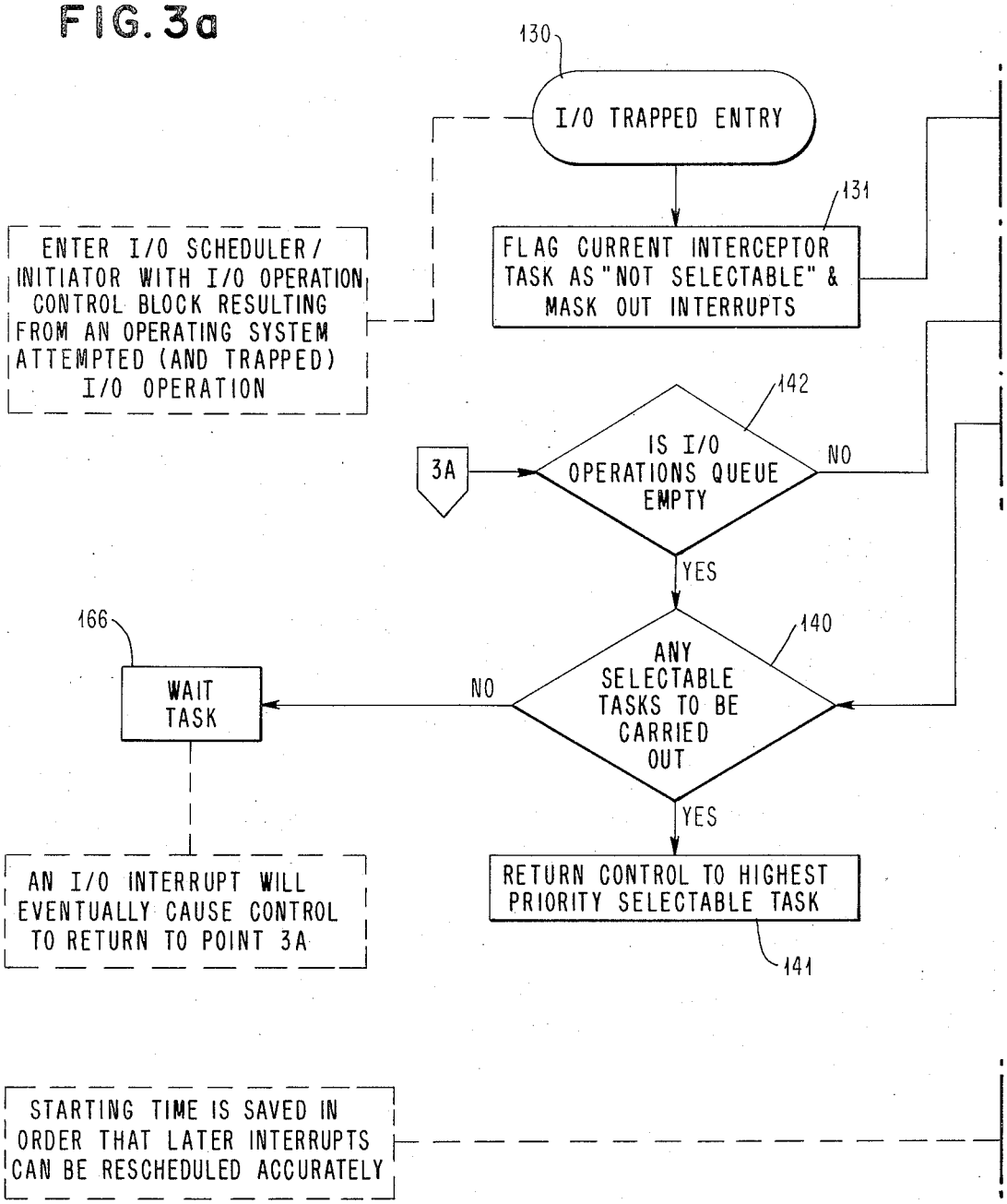
Figure 3B:
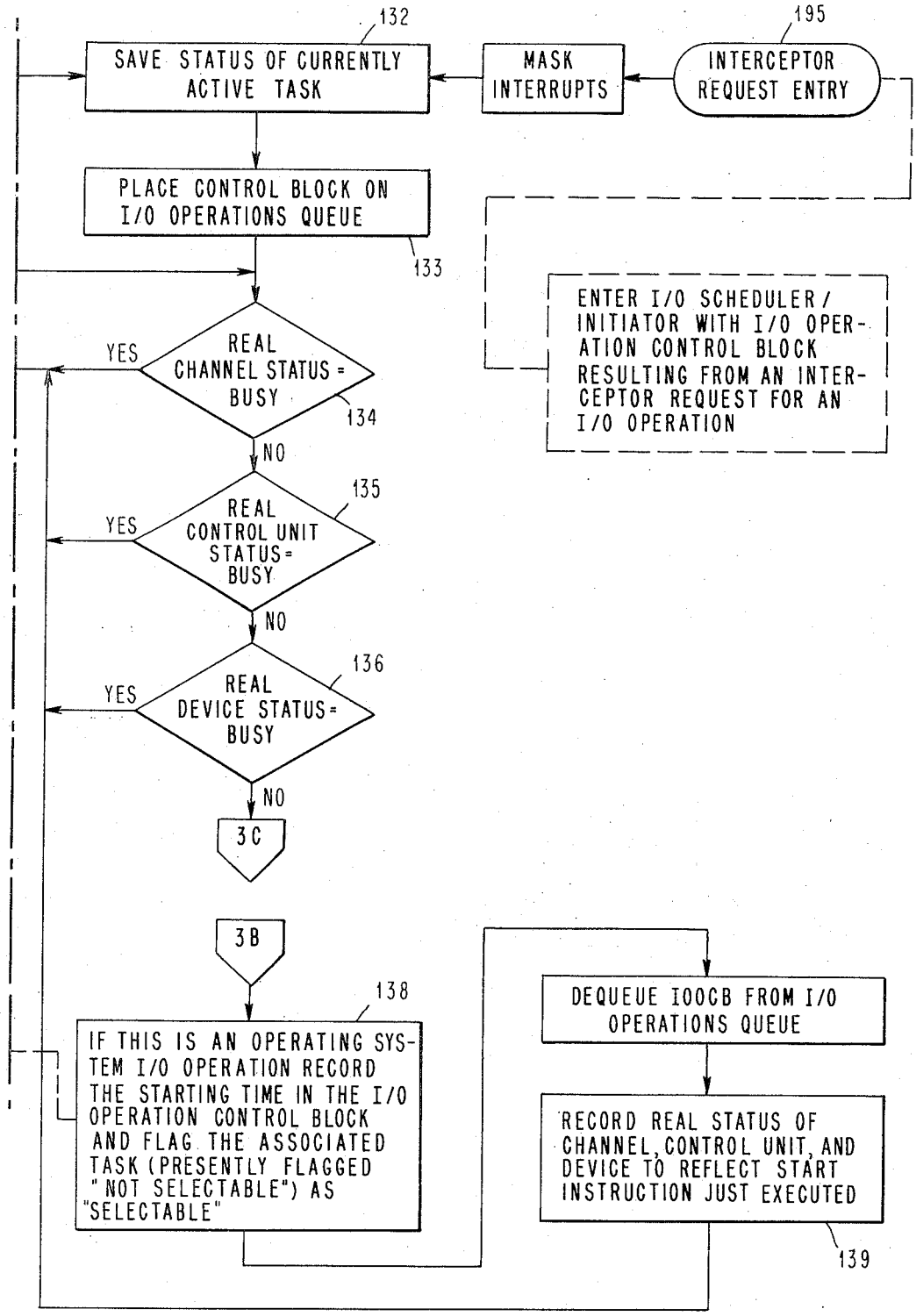
Figure 3C:
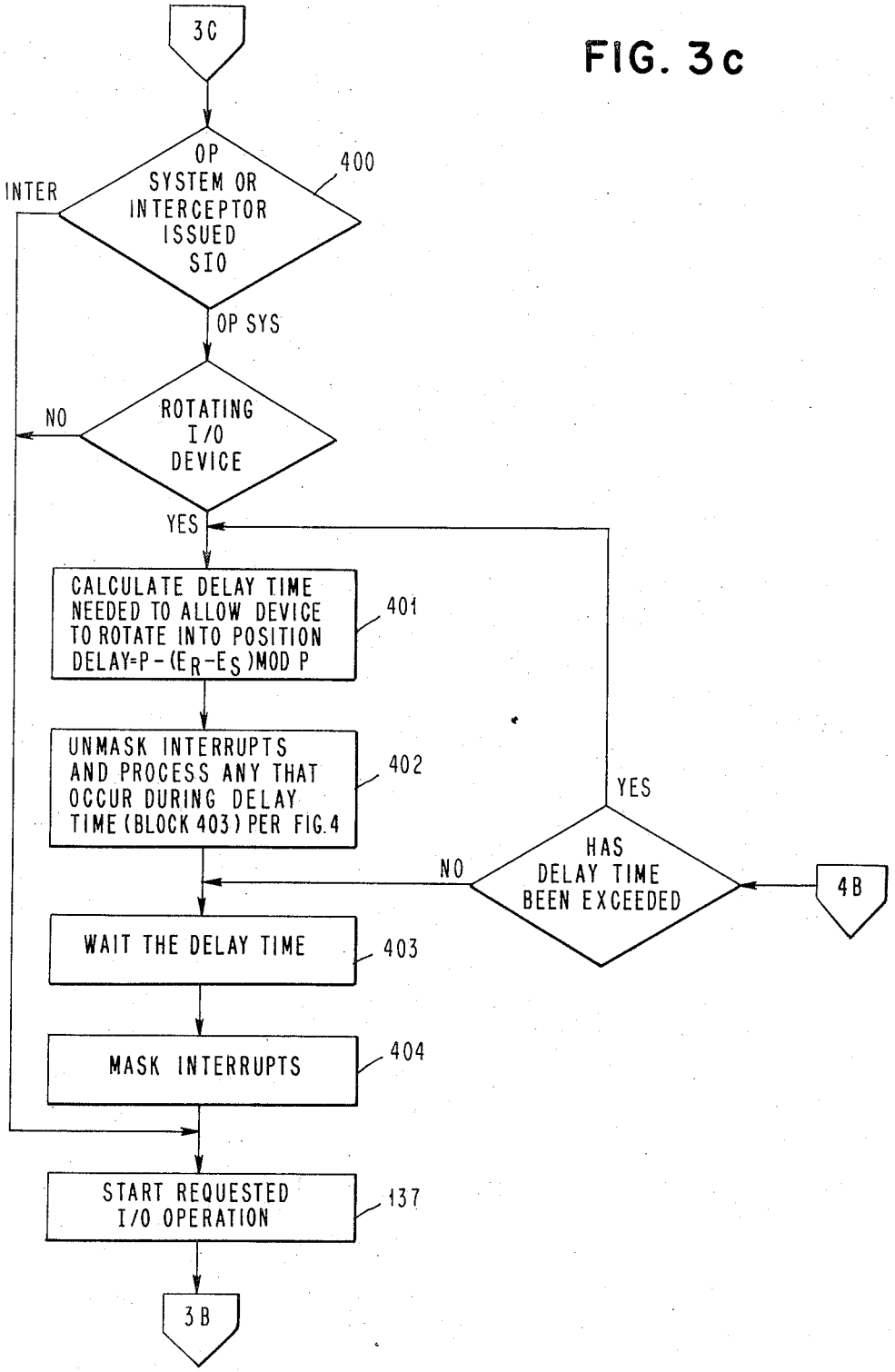
Figure 4A:
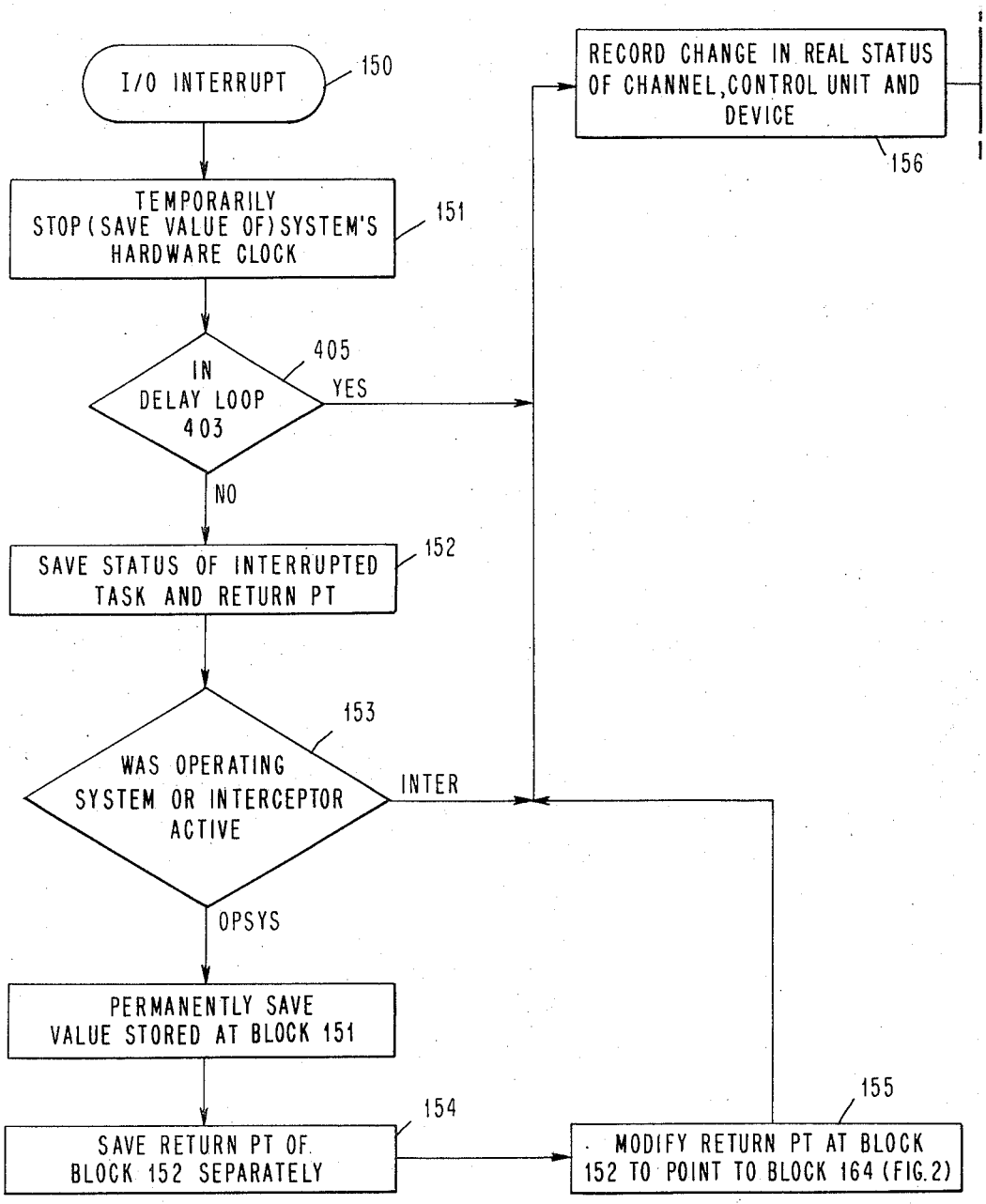
Figures 4B, 4C:
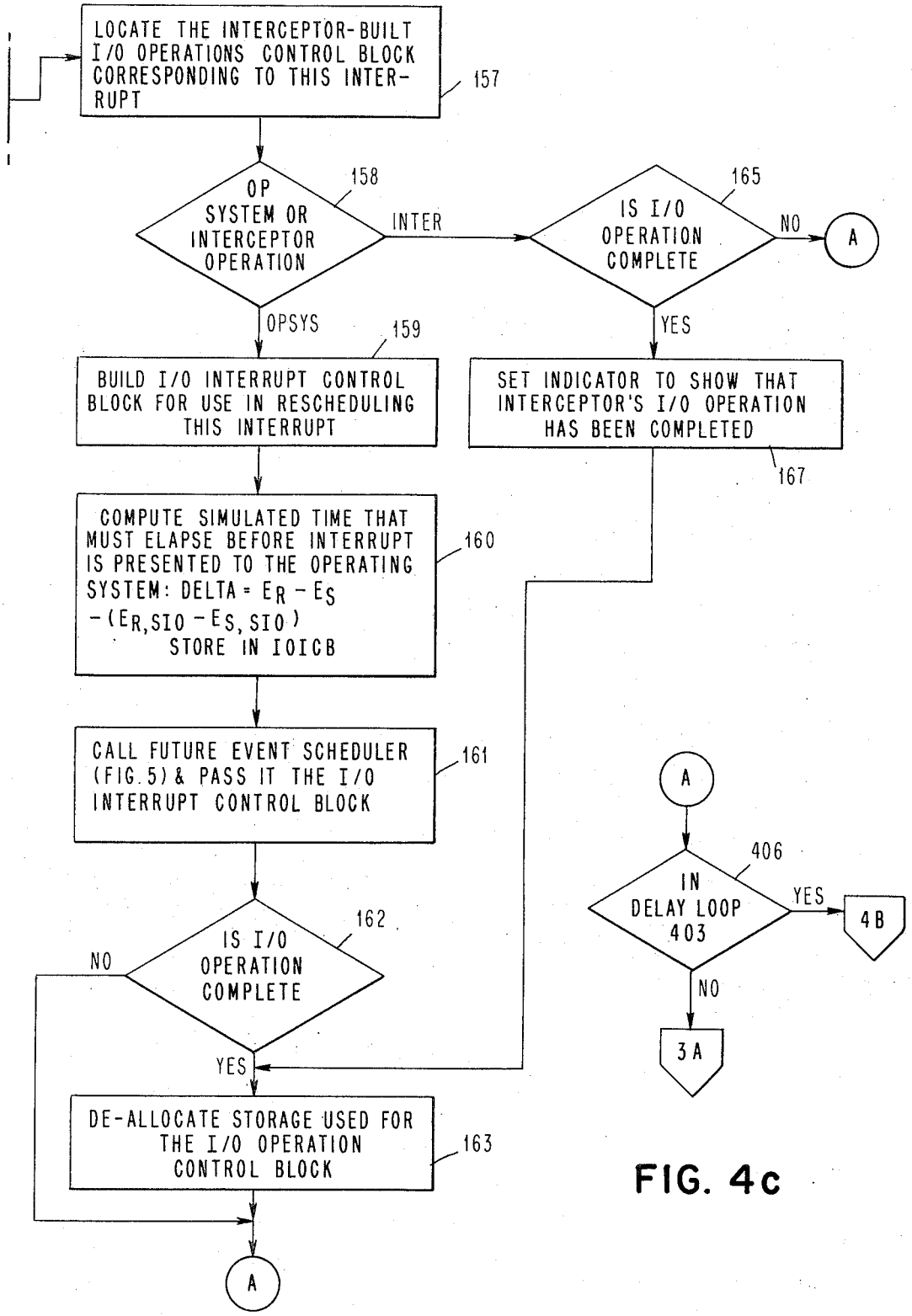
Figure 5:
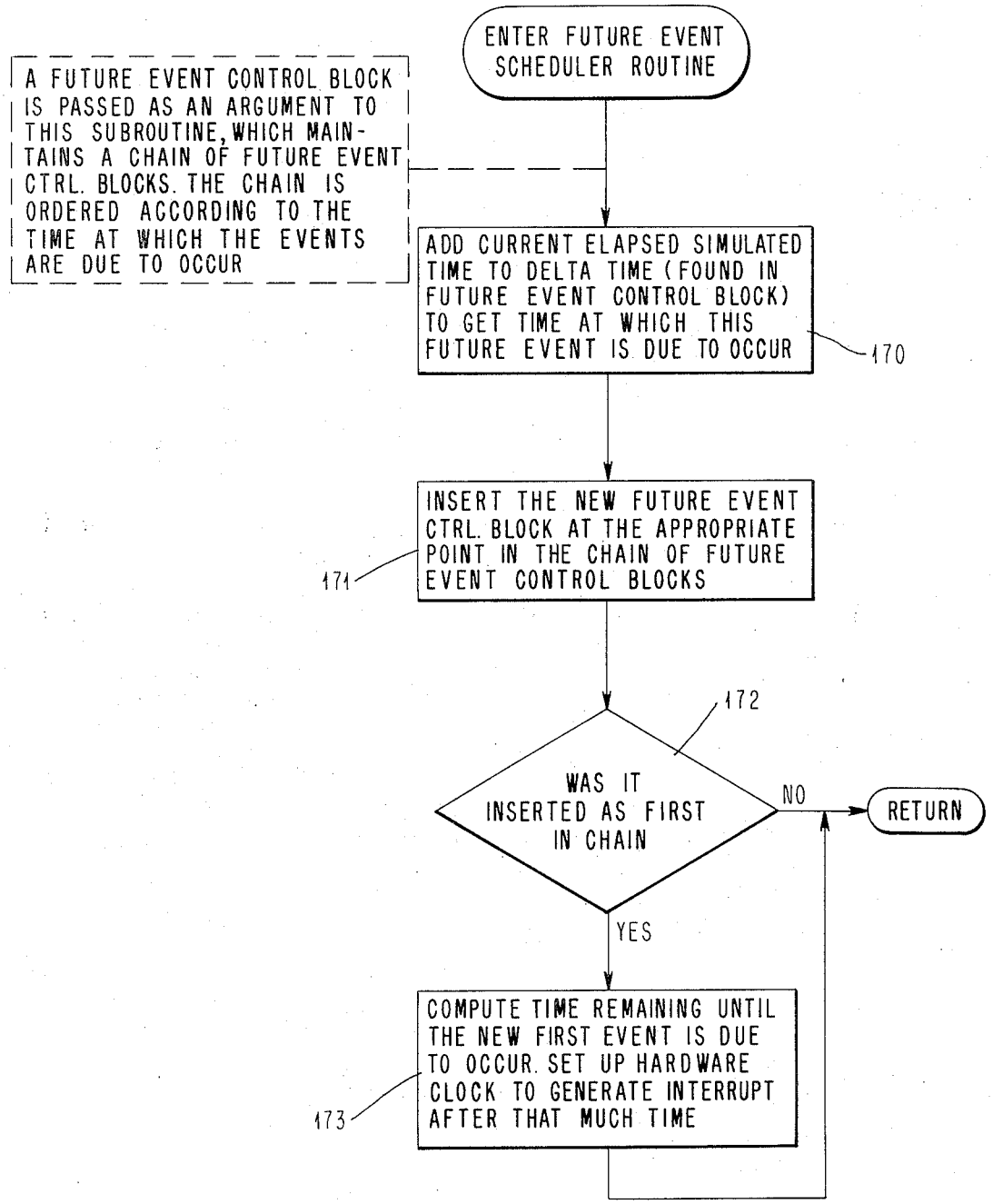
Figure 6:
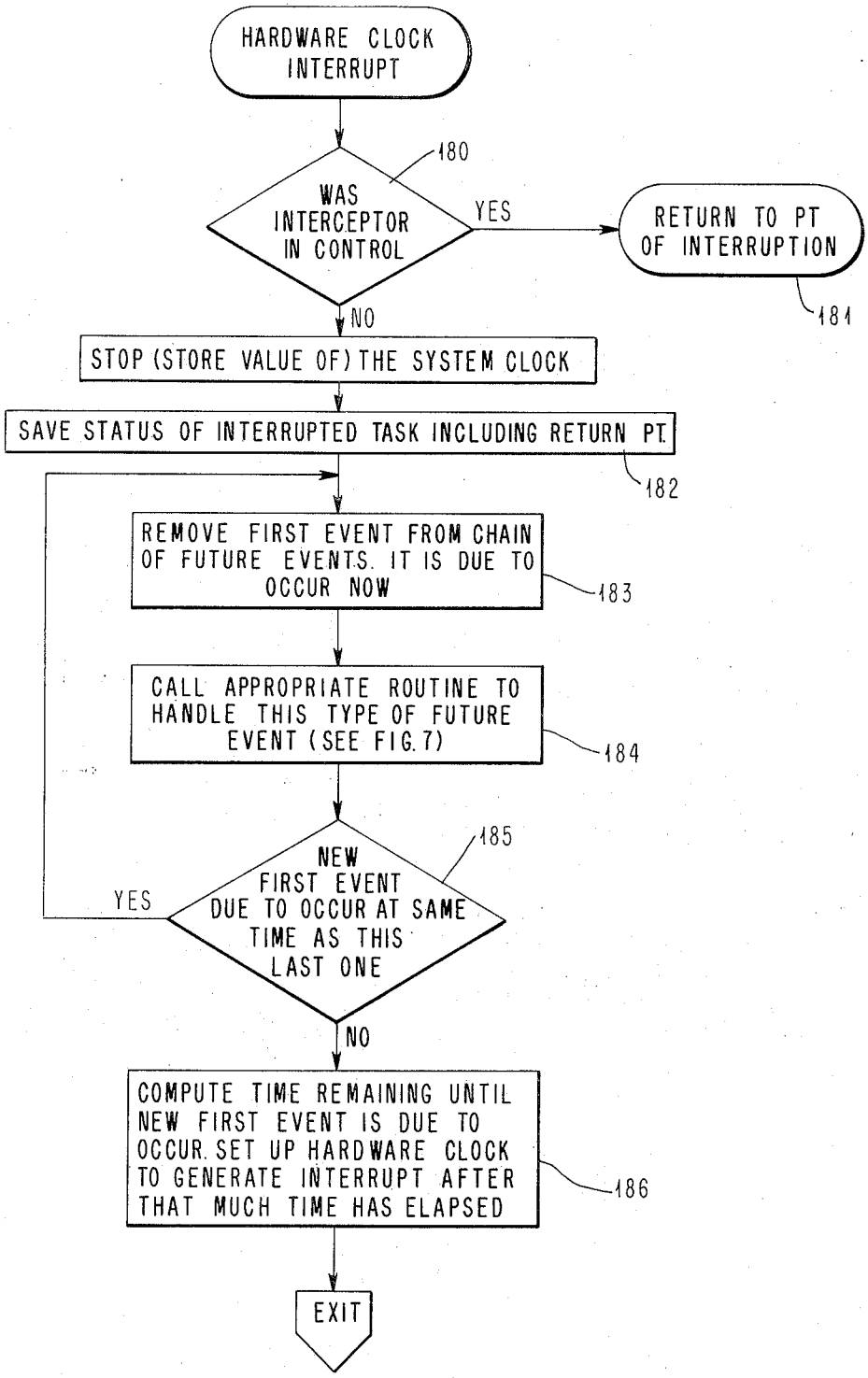
Figure 7:
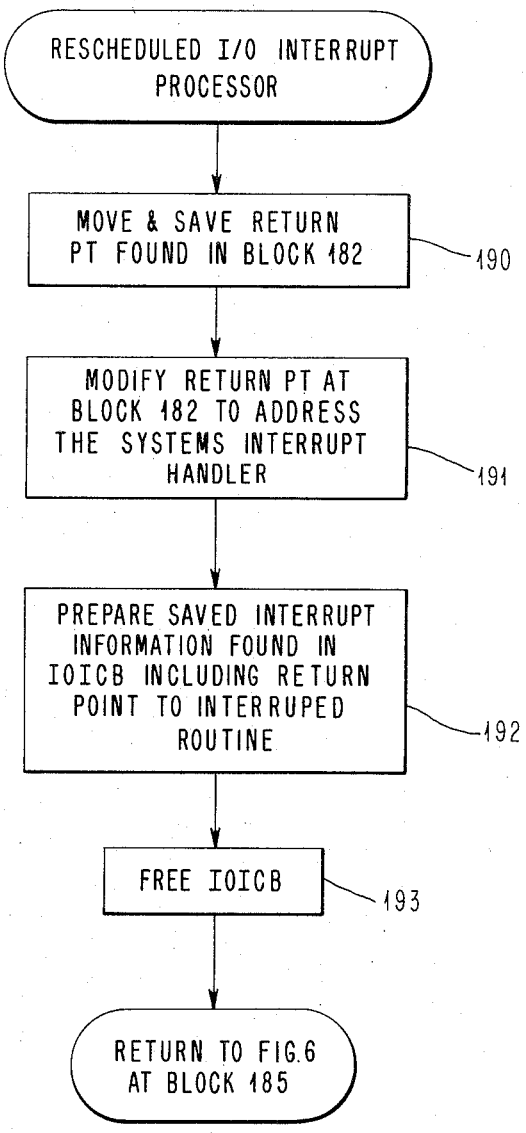

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 9, 1974

921 O.G. 439

T921,009

REPOSITIONING ROTATING PERIPHERAL DEVICES

Gerald Allen Davison, Poughkeepsie, N.Y., assignor to International Business Machines Corporation, Armonk, N.Y.

Continuation of abandoned application Ser. No. 218,731, Jan. 18, 1972. This application July 23, 1973, Ser. No. 381,655

**Int. Cl. G06f *13/04;* G05b *13/02***

U.S. Cl. 444—1

14 Sheets Drawing. 37 Pages Specification

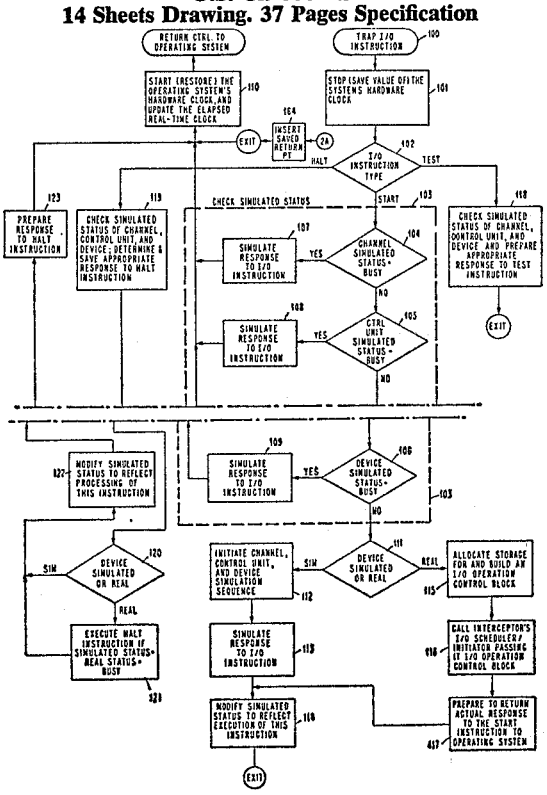

To evaluate computer system performance, software techniques are frequently used to collect data on the system as it runs, and/or to simulate new devices. However, data collecting, simulating and report writing procedures degrade the performance of the system on which they are run and therefore provide distorted results. The technique herein is designed to hide the overhead procedure from the performance of the system by using prior art procedures in stopping the system clock whenever an overhead program is being executed, and adding to that a technique for compensating for distortion in the I/O area by intercepting and rescheduling I/O interrupts to compensate for the "stolen" time during which the system clock is stopped, and further delaying the scheduling of the I/O operation to compensate for changes in position of rotating peripheral devices during the "stolen" period.

The procedure involves the determination of the actual position of a rotating peripheral device relative to its expected position either by comparing positions or by comparing actual rotating time to expected rotating time. From this information, together with knowledge of the rotational rate, a computation of the length of time during which an I/O operation must be delayed may be made so that the actual and expected positions are in alignment upon execution of the delayed I/O operation.

REPOSITIONING ROTATING PERIPHERAL DEVICES

Original Filed Jan. 18, 1972 14 Sheets-Sheet 1

REPOSITIONING ROTATING PERIPHERAL DEVICES

Original Filed Jan. 18, 1972 14 Sheets-Sheet 2

REPOSITIONING ROTATING PERIPHERAL DEVICES

Original Filed Jan. 18, 1972 14 Sheets-Sheet 3

REPOSITIONING ROTATING PERIPHERAL DEVICES

Original Filed Jan. 18, 1972 14 Sheets-Sheet 6

FIG. 8

IOICB

| | | |
|---|---|---|
| TEBCHN X'00' | USED FOR CHAINING BLOCKS TOGETHER | |
| TEBTME CONTAINS DELTA TIME WHEN BUILT, LATER CONTAINS SIMULATED TIME OF INTERRUPT | | |
| TEBRTN ADDRESS OF ROUTINE TO PROCESS EVENT WHEN IT OCCURS | | |
| IOICBCW CSW FOR I/O INTERRUPT | | |
| CSW (CONTINUED) | | |
| IOICBDVC UNIT ADDRESS OF INTERRUPTING DEVICE | IOICBFB FLAGS | NOT USED |
| | | |

FIG. 9a

IOOCB (FORMAT FOR OS OPERATION FROM TRAPPED SIO)

| | | |
|---|---|---|
| CPCBCHN RESERVED FOR I/O SCHEDULER TO CHAIN IOICB'S TOGETHER | | |
| NOT USED | CPCBFLGS FLAGS | NOT USED |
| CPCBCAW I/O PROTECT KEY | CHANNEL PROGRAM ADDRESS | |
| CPCBRTIM VALUE OF REAL TIME CLOCK AT SIO-VALUE OF SIMULATED TIME CLOCK AT SIO ($E_{R,SIO}-E_{S,SIO}$) | | |
| | | |

FIG.9b

IOOCB (FORMAT FOR INTERCEPTOR I/O OPERATIONS)

| | | |
|---|---|---|
| CPCBSENS<br>CPCBCHN | SENSE DATA | |
| SENSE DATA | CPCBFLGS<br>FLAGS | CPCBECB<br>RELATIVE ECB<br>NUMBER |
| CPCBCAW<br>I/O PROTECT<br>KEY | CHANNEL PROGRAM ADDRESS | |
| CPCBCSW | CSW | |
| CSW | | |
| CPCBPCI<br>NOT USED | PCI APPENDAGE ROUTINE ADDRESS<br>(OPTIONAL) | |
| | | |

FIG. 10

DVCB (DEVICE CONTROL BLOCK)

| | | |
|---|---|---|
| DVCBCHN<br>X'00' | POINTER TO LCB OR IOOCB | |
| DVCBUNAD<br>UNIT ADDRESS | | DVCBFLGS<br>FLAGS |
| DVCBCOCB<br>COCB<br>POINTER | DVCBROT<br>ROTATION TIMING<br>POINTER | DVCBHASH<br>HASH POINTER |
| BELOW IS AN ALTERNATE FORMAT OF THE DVCBCHN FIELD | | |
| X'FF' | NOT USED | DVCBECB<br>RELATIVE ECB<br>NUMBER |

FIG. 11

CHCB (CHANNEL CONTROL BLOCK)

| | | | |
|---|---|---|---|
| CHCBPEND X'00' | POINTER TO 1ST PENDING IOICB | | |
| CHCBFLGS FLAGS | CHCBSIMB CHANNEL SIMULATED BUSY | CHCBOS SIMULATED BUSY, REALLY BUSY, OS INTERRUPT EXPECTED, OS USED LAST | CHCBTPD REALLY BUSY, INTERCEPTOR USED LAST |
| CHCBQLEN CHANNEL QUEUE LENGTH | CHCBSM SYSTEM MASK BIT FOR CHANNEL | CHCBCUB CONTROL UNIT BLOCKAGE COUNT | |
| CHCBQ CHANNEL QUEUE ENTRY NUMBER OF QUEUE ENTRIES = ONE FOR OS + ONE FOR EACH INTERCEPTOR DEVICE | | | |

FIG. 12

COCB (CONTROL UNIT CONTROL BLOCK)

| | | |
|---|---|---|
| COCBLBID POINTER TO A CHAIN OF IOICB'S FOR LOCKED BID KEYS | | |
| COCBFLGS FLAGS | COCBBASE CONTROL UNIT BASE ADDRESS | COCBFLGX FLAGS |